United States Patent
Myrick et al.

(10) Patent No.: US 10,754,567 B2
(45) Date of Patent: *Aug. 25, 2020

(54) PARTIALLY DEACTIVATED APPLICATION WITH TERMINATION PROTECTION

(71) Applicant: Apple Inc., Cupertino, CA (US)

(72) Inventors: Andrew D. Myrick, San Francisco, CA (US); Lionel D. Desai, San Francisco, CA (US); Joseph Sokol, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/203,557

(22) Filed: Nov. 28, 2018

(65) Prior Publication Data

US 2019/0095120 A1 Mar. 28, 2019

Related U.S. Application Data

(63) Continuation of application No. 15/662,908, filed on Jul. 28, 2017, now Pat. No. 10,528,281, which is a continuation of application No. 14/728,971, filed on Jun. 2, 2015, now Pat. No. 9,720,617.

(51) Int. Cl.
| | | |
|---|---|---|
| *G06F 3/06* | (2006.01) | |
| *G06F 12/1009* | (2016.01) | |
| *G06F 12/1027* | (2016.01) | |
| *G06F 12/109* | (2016.01) | |
| *G06F 12/08* | (2016.01) | |

(52) U.S. Cl.
CPC .......... *G06F 3/0643* (2013.01); *G06F 3/0604* (2013.01); *G06F 3/0632* (2013.01); *G06F 3/0679* (2013.01); *G06F 12/1009* (2013.01); *G06F 12/109* (2013.01); *G06F 12/1027* (2013.01); *G06F 12/08* (2013.01); *G06F 2212/1016* (2013.01); *G06F 2212/401* (2013.01)

(58) Field of Classification Search
CPC ............... G06F 3/0643; G06F 12/1009; G06F 12/1027; G06F 12/109; G06F 3/0604; G06F 3/0632; G06F 3/0679; G06F 2212/1016; G06F 2212/401; G06F 12/08
USPC .............. 710/68; 709/247; 341/50; 708/203; 711/170, 6, 103
See application file for complete search history.

(56) References Cited

U.S. PATENT DOCUMENTS

| | | | |
|---|---|---|---|
| 6,266,753 | B1 | 7/2001 | Hicok et al. |
| 7,089,391 | B2 | 8/2006 | Geiger et al. |
| 8,516,005 | B2 | 8/2013 | Ergan et al. |
| 8,661,189 | B2 | 2/2014 | Post et al. |
| 9,720,617 | B2 * | 8/2017 | Myrick ................. G06F 3/0643 |
| 10,528,281 | B2 * | 1/2020 | Myrick ............... G06F 12/1009 |
| 2005/0132161 | A1 | 6/2005 | Makela et al. |

(Continued)

*Primary Examiner* — Hong C Kim
(74) *Attorney, Agent, or Firm* — Womble Bond Dickinson (US) LLP

(57) ABSTRACT

In one embodiment, when a secondary application on an electronic device is selected for deactivation, the memory associated with the application can be gathered, compacted and compressed into a memory freezer file. The memory freezer file can be stored in non-volatile memory with a reduced storage footprint compared to a memory stored in a conventional swap file. When the selected application is to be reactivated, the compressed memory in the memory freezer file can be quickly restored to process memory.

22 Claims, 14 Drawing Sheets

(56) References Cited

U.S. PATENT DOCUMENTS

| | | |
|---|---|---|
| 2007/0005911 A1 | 1/2007 | Yang et al. |
| 2009/0327621 A1 | 12/2009 | Kliot et al. |
| 2013/0007345 A1* | 1/2013 | Barbou-Des-Places ............. G06F 9/461 711/103 |
| 2014/0189281 A1* | 7/2014 | Sokol, Jr. ............. G06F 3/0664 711/171 |
| 2015/0011196 A1 | 1/2015 | Jayakumar et al. |
| 2015/0347181 A1* | 12/2015 | Myrick ............. G06F 11/34 718/102 |

* cited by examiner

PARTIALLY DEACTIVATED APPLICATION WITH TERMINATION PROTECTION

RELATED APPLICATIONS

The present application is a continuation application of co-pending U.S. patent application Ser. No. 15/660,908, filed Jul. 28, 2017, which is a continuation application of U.S. patent application Ser. No. 14/728,971, filed Jun. 2, 2015, now issued as U.S. Pat. No. 9,720,617, which is incorporated herein by reference in its entirety.

BACKGROUND OF THE DISCLOSURE

Virtualization techniques have been developed to enable computing devices to execute programs using a virtual memory space with a size exceeding the actual physical capacity of the memory on the device. This may particularly be of use on mobile and handheld devices that, due to physical size constraints, may have a reduced amount of process memory and data storage capacity relative to larger form factor devices. However, conventional virtual memory systems utilize memory swapping techniques in which unused regions of virtual memory may be swapped to a storage device coupled to the memory device to free regions of process memory. However, mobile and handheld devices often lack a swap file or swap partitions (e.g., a backing store) as used in some larger form factor devices. Without a backing store, regions of virtual memory may simply be discarded from process memory by the virtual memory system if additional memory is required to execute a new process. If the discarded virtual memory contains any modifications, those modifications may be lost during the discard, resulting in application termination or a loss or application state.

SUMMARY OF THE DESCRIPTION

In various embodiments, a virtual memory system for mobile and handheld electronic devices is disclosed in which, in one embodiment, the lack of a traditional backing store or swap file can be remedied by compacting and storing memory into a compacted and compressed 'freezer file.'

One embodiment provides for a method comprising gathering a first set of compressed data elements from a first region of virtual memory addresses; gathering a set of uncompressed data elements from a second region of virtual memory addresses, the first and second regions of virtual memory addresses associated with a process; compacting the first set of compressed data elements into a first set of compacted memory segments; compressing the uncompressed data elements into a second set of compressed data elements; compacting the second set of compressed data elements into a second set of compacted memory segments; and storing the first and second set of compacted memory segments to a third region of virtual memory addresses.

In one embodiment a non-transitory computer-readable medium stores instructions for an operating environment of a data processing system to generate, via one or more processors, an application specific compressed and compacted memory freezer file via operations comprising gathering a first set of compressed data elements from a first region of virtual memory addresses. The first region of virtual memory addresses can be associated with a compressed memory pool, and the gathering can be in response to a request to deactivate an application process on a mobile or handheld device. The compressed data elements that are gathered from the compressed memory pool are associated with or are specific to the application process.

In one embodiment, the medium includes additional instructions to cause the operating environment, via the one or more processors, to compact the first set of compressed data elements into a first set of one or more compacted memory segments after gathering the compressed data elements. The instructions can additionally cause the gathering of a set of uncompressed data elements from a second region of virtual memory addresses. The set of uncompressed data elements gathered from uncompressed memory continue to be associated with the application process.

In one embodiment, the instructions cause the performance of additional operations including compressing the uncompressed data elements into a second set of compressed data elements, compacting the second set of compressed data elements into a second set of one or more compacted memory segments, and storing the first and second set of compacted memory segments to a third region of virtual memory addresses not associated with the application process. Storing the compacted memory segments to the third region of virtual memory addresses can be performed without fully deactivating the application process. For example, the application process can remain on a list of active tasks while in a frozen or partially deactivated state.

In one embodiment, a virtual memory system includes one or more processors coupled to a memory device, where the memory device is configured to store a compressed memory pool that is dynamically mapped to a first region of virtual memory addresses and an uncompressed memory pool that is dynamically mapped to a second region of virtual memory addresses. The system can additionally include a storage device that is coupled to the one or more processors. The storage device can have storage addresses that are dynamically mapped to a third region of virtual memory addresses. In one embodiment, the storage device is configured to store a first and second set of compacted memory segments associated with a partially deactivated process. In one embodiment, the one or more processors of the system are further configured to map at least the second set of compacted memory segments into the second region of virtual memory in association with a request to reactivate the partially deactivated process.

In one embodiment, a mobile or handheld electronic device includes one or more processors coupled to a bus and a memory device that is also coupled to the bus. The memory device can be configured to store a process for execution by the one or more processors, where the process is flagged as a process to be protected from termination after the process is partially deactivated. In one embodiment, the process is partially deactivated after the one or more processors perform operations to gather a first set of compressed data elements from a first region of virtual memory addresses, and the first set of compressed data elements associated with the process and compact the first set of compressed data elements into a first set of one or more compacted memory segments. The one or more processors can be further configured to gather a set of uncompressed data elements from a second region of virtual memory addresses, where the set of uncompressed data elements are associated with the process, and compress the uncompressed data elements into a second set of compressed data elements. The second set of compressed data elements can be compacted into a second set of one or more compacted memory segments, and the one or more processors can store the first and second set of compacted memory segments to a third region of virtual memory addresses. In one embodiment, after the compacted memory segments are stored, the device can request a partial deactivation of the process. In one embodiment, the physical memory of the partially deactivated process is released or re-allocated while the process is partially disabled, while the virtual memory allocations of the process remain in place.

References to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The above summary does not include an exhaustive list of all aspects or embodiments of the present invention. It is contemplated that the embodiments of the invention include all systems and methods that can be practiced from all suitable combinations of the various aspects summarized above. Moreover, other features of the present invention will be apparent from the accompanying drawings, a brief description of which is provided below.

BRIEF DESCRIPTION OF THE DRAWINGS

The present embodiments are illustrated by way of example, and not limitation, in the figures of the accompanying drawings in which like references indicate similar elements, and in which.

DETAILED DESCRIPTION

Various embodiments and aspects of a virtual memory system for mobile and handheld devices in which, in one embodiment, the lack of a traditional backing store is remedied by compacting and storing memory into a compacted and compressed 'freezer file.' In one embodiment, when an application is selected for deactivation, memory associated with the application is gathered, compacted and compressed into a freezer file, which can be stored in non-volatile memory with a reduced storage footprint compared to a conventional swap file. When the selected application is to be reactivated, the compressed virtual memory in the freezer file can be restored to process memory.

The following description is illustrative of various embodiments of the invention and is not to be construed as limiting. Numerous specific details are described to provide a thorough understanding of various embodiments of the present invention. However, in certain instances, well-known or conventional details are not described in order to provide a concise discussion of embodiments of the present invention.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2015.

Virtual Memory Overview

Figure 1:
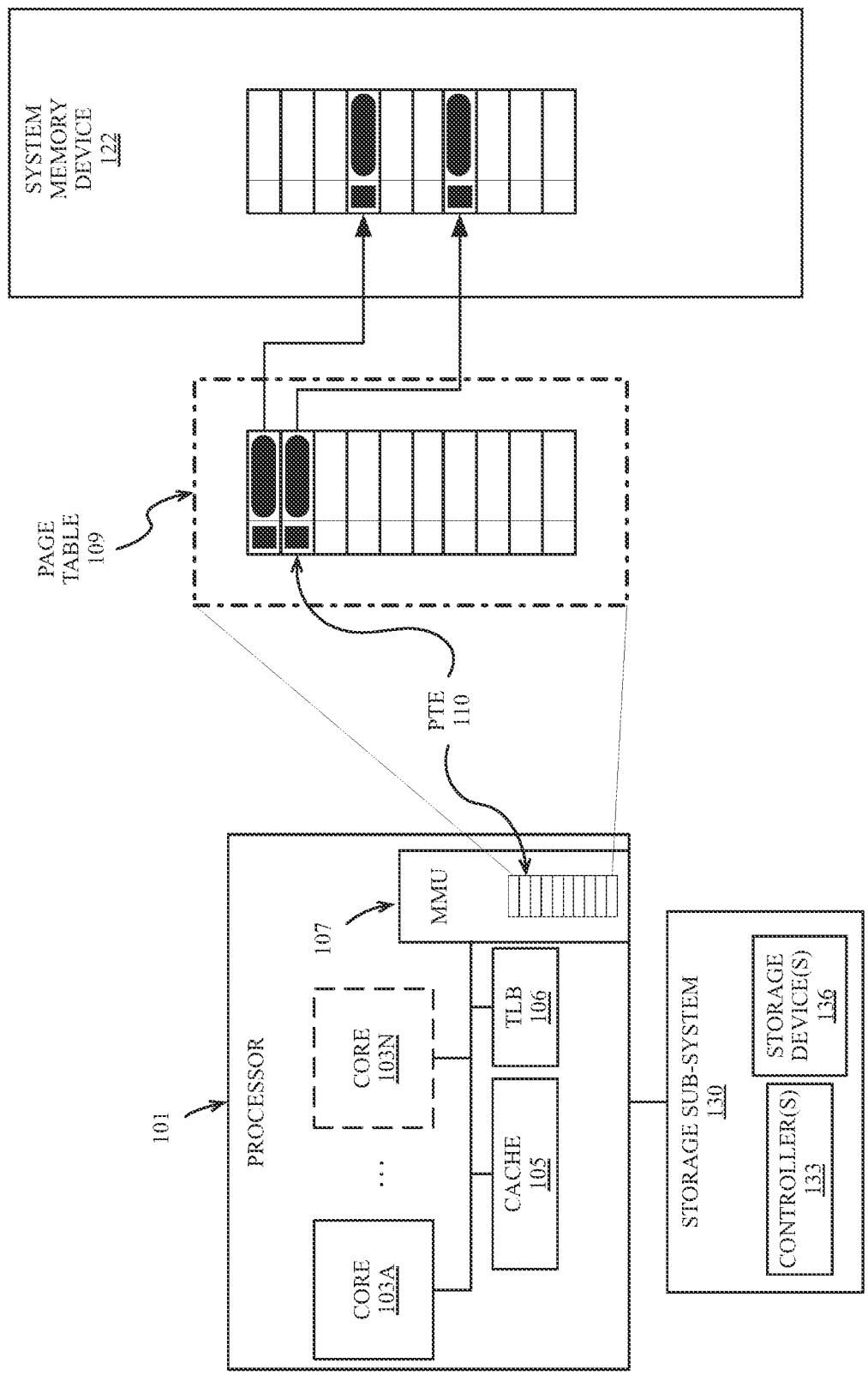
FIG. 1 is a block diagram of exemplary data processing system components including hardware to implement a virtual memory system, according to an embodiment.

FIG. 1 is a block diagram of exemplary data processing system components including hardware to implement a virtual memory system, according to an embodiment. The exemplary system includes a processor 101 having one or more cores 103A-N, a cache 105, a memory management unit 107 (MMU), and a translation lookaside buffer (TLB) 106. The system further includes a physical system memory device 122 and a storage sub-system 130 including one or more controllers 133 coupled to one or more storage devices 136. The exemplary virtual memory system can be configured to present disjoint regions of the system physical memory device 122 as a contiguous virtual memory address space and can be included in a mobile or handheld data processing system.

The MMU 107 included in the processor can be configured to accelerate virtual memory to physical memory address translation in hardware. The MMU 107 can be configured with the address of one or more page tables 109 stored in the physical system memory device 122. Each page table 109 is a data structure that contains multiple page table entries (e.g., PTE 110) containing the physical address of a page of memory. The size of a memory page can vary based on system configuration and processor architecture. Each page table is indexed by the virtual address of the page of memory. Data from the page table 109 can be cached in the TLB 106 to further accelerate address translation.

The MMU 107 uses data in the TLB 106 or in the page table 109 in memory to translate a given input virtual address into an output physical address if a physical memory address exists in the physical system memory device 122 for the given virtual address. A virtual memory address contains several bits, the number of bits corresponding to the size of the virtual address space. A portion of the bits can correspond to a virtual page related to the memory address, and a portion of the bits can correspond to a memory offset within the page, depending on the virtual memory configuration of the system. A 64-bit virtual memory system can use up to 64 bits of address space, allowing over 18 exabytes of addressable space. Accordingly, the virtual memory system can enable an operating system of a computing device to address significantly more memory than physically included in the system.

In conventional virtual memory systems, as available space in the system physical memory device 122 is consumed, virtual memory pages on the memory device 122 may be backed up to the storage subsystem 130. However, in systems lacking traditional swap partitions or swap files, virtual memory pages on the memory device 122 may simply be removed from the system memory device 122 and discarded (e.g., in association with terminating any applications using the discarded virtual memory pages).

In several embodiments described herein, mobile and handheld devices provide support for secondary applications that are frequently started and stopped or frequently transitioned from a foreground to a background or hidden state. On devices in which a backing store is enabled, the virtual memory pages for such applications may be paged out to one or more storage devices 136 while the secondary application is inactive. However, on systems without conventional swap files, inactive secondary applications risk being terminated by the virtual memory system. Such termination may result in increased system latency when the secondary application is restored.

Compressed Virtual Memory

Compressed virtual memory can be employed in place of or in addition to a conventional virtual memory backing store. A compressed region of virtual memory can be enabled by the virtual memory system and mapped to an address region in volatile memory. Active virtual memory pages in uncompressed volatile memory may be compressed and copied out to the compressed region virtual memory instead of or in addition to being swapped to nonvolatile memory.

In one implementation of compressed virtual memory, virtual memory pages are managed in a manner that is agnostic to the applications making use of the virtual memory. In such implementation, compressed memory for multiple applications may be stored in the same region of compressed memory. Additionally, the virtual memory pages for the various applications may be paged into and out of compressed virtual memory based on a usage pattern of the virtual memory pages, rather than the usage pattern of individual applications.

To resolve this issue, embodiments of a compressed virtual memory system can be configured to provide an application centric compressed virtual memory implementation. The application specific compressed virtual memory system, in various embodiments, gathers, compress and compacts application memory into a compressed freezer file. The compressed freezer file implementation can be optimized for applications that are frequently enabled and disabled, or frequently transitioned between a visible and hidden state within a user interface.

In one embodiment, a device can mark applications that are frequently enabled or disabled as a special application. When a user disables or hides an application marked as special, instead of fully disabling the application, the virtual memory pages for the application can be isolated, compacted, compressed, and 'frozen' into a contiguous block of compressed and compacted virtual memory and the application can be placed into a partially disabled state by the system. In one embodiment, the compressed and compacted virtual memory can be stored as a compressed freezer file to non-volatile memory on the device and the physical memory backing the virtual memory allocations can be released or re-allocated to other applications.

In one embodiment, storing the compressed freezer file to non-volatile storage includes mapping the virtual memory addresses of the application to an address region in non-volatile memory and performing a virtual memory swap operation to the non-volatile memory. A mapping between the virtual memory addresses for the application and regions of the compressed freezer file can be maintained such that when the application is subsequently resumed or reactivated, a virtual memory page fault causes regions of the compressed freezer file to be loaded into virtual memory addresses associated with one or more of the compressed or uncompressed regions of memory.

Figure 2:
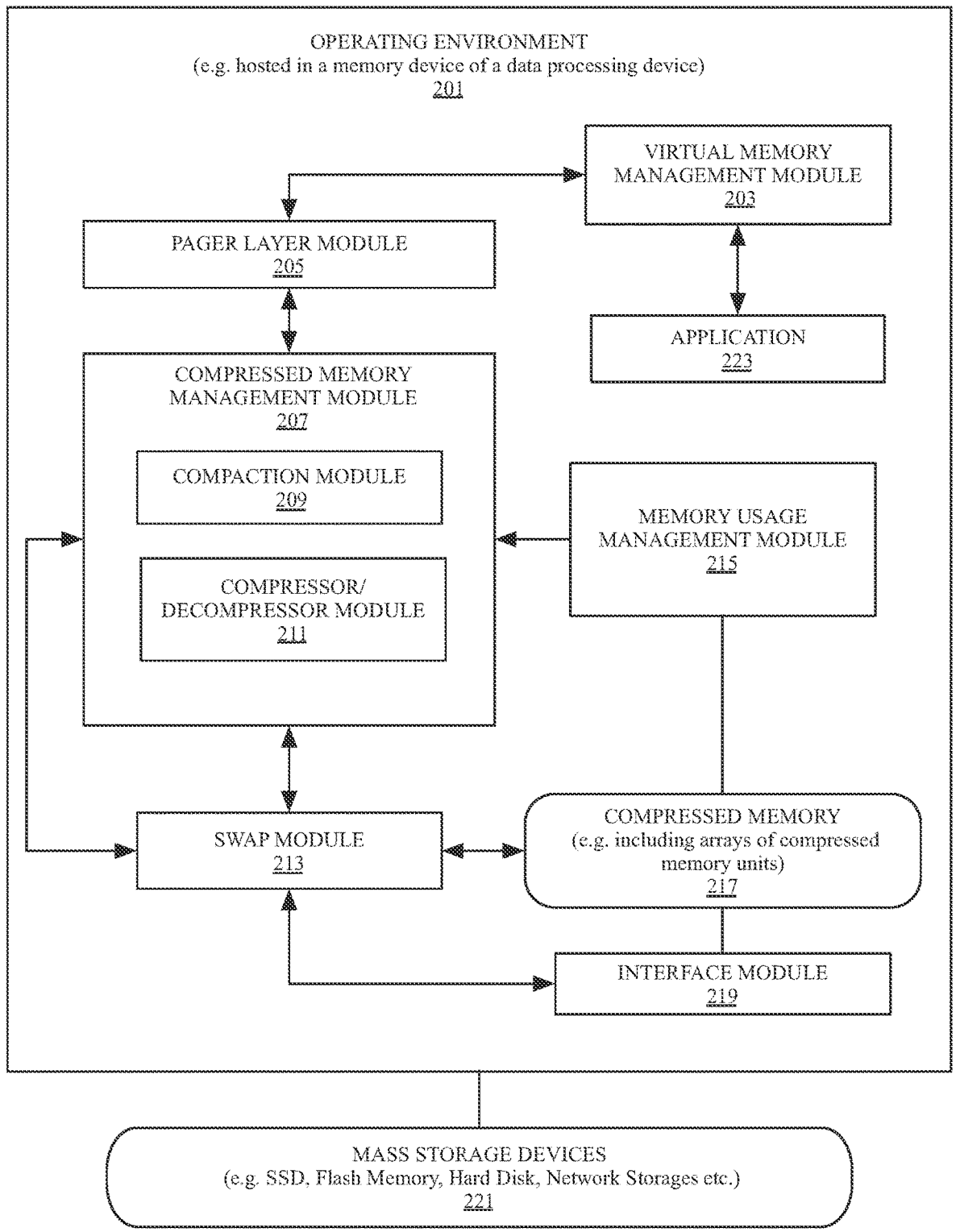
FIG. 2 is a block diagram illustrating an operating environment configured to enable freezer files storing compressed and/or compacted virtual memory, according to an embodiment.

FIG. 2 is a block diagram illustrating an operating environment 201 of a compressed virtual memory system configured to enable freezer files storing compressed and/or compacted virtual memory, according to an embodiment. In one embodiment, the operating environment 201 is hosted in a memory device of a mobile data processing system (e.g., within a mobile or handheld electronic device). The memory device can be a system memory device 122 as in FIG. 1 or any random access memory (RAM) device that supports execute-in-place data processing for one or more processor cores of a processor device (e.g., processor 101 of FIG. 1) or one or more processors of a processing system. The data processing system additionally includes one or more mass storage devices 221.

The operating environment 201 can include a virtual memory management module 203 in communication with an application 223 and a pager layer module 205. In one embodiment, the pager layer module 205 can be configured to communicate with a compressed memory management module 207. In one embodiment, the compressed memory management module 207 includes a compaction module 209 and a compressor/decompressor module 211. The compressed memory management module 207 can be configured to manage a pool of compressed memory 217 in the memory device. The pool of compressed memory is, in one embodiment, an address region of the memory device that is configured to store compressed memory pages. The address region of the compressed memory pool can be mapped to an address region of virtual memory as a separate region from the uncompressed memory used for process execution.

While a conventional backing store may not be supported for various reasons (e.g., limited flash memory capacity or write endurance), in some embodiments regions of compressed memory may be mapped or written to an address on the one or more mass storage devices 221, for example, to create additional space in compressed memory 217. In one embodiment, the compressed memory 217 includes arrays of compressed memory units, which may be variable sized compressed memory units. Each compressed memory unit can correspond to one or more virtual memory pages in uncompressed memory. Multiple variable sized compressed memory units in the compressed memory 217 can be compacted by the compaction module 209 into one or more fixed sized compacted memory segments. In one embodiment, the compacted memory segments are sized to facilitate efficient I/O transfer within or between memory devices on the data processing device, such as the memory device hosting the operating environment 201 and the one or more pass storage devices 221. Exemplary compacted memory segment sizes include 128 or 256 kilobytes. However, the specific size of the compacted memory segments can vary based on the I/O configuration of the data processing system.

In one embodiment, the compressed memory management module 207 couples with a swap module 213 to move the compacted memory segments between compressed memory 217 and the mass storage device 221. In one embodiment, the swap module 213 moves the compacted memory segments to and from the mass storage devices via an interface module 219. The compacted memory segments can include compressed data elements (e.g., compressed virtual memory pages) associated with the application 223.

In one embodiment, the operating environment 201 includes a memory usage management module 215 to manage memory usage of the operating environment 201. The memory usage management module 215 can perform various operations to increase the amount of physical memory available to executing applications based on the current state of system memory usage. The various operations can include terminating unused applications to reclaim memory space. However, in one embodiment when the application 223 is partially disabled the virtual memory associated with the application is not released. To prevent the memory usage management module 215 from completely terminating the partially disabled application, the application 223 can be placed into a protected state to prevent the memory usage management module 215 from terminating the application 223 and reclaiming the virtual memory of the application. Protecting the application 223 from termination may not significantly impact the amount of memory available to the operating environment 201 when the application memory is compacted into the compressed and compacted block of memory. Moreover, space on the memory device (e.g., system memory device 122 of FIG. 1) may be made available by swapping the compressed and compacted block of memory to an application memory freezer file on a non-volatile memory device.

Figure 3:
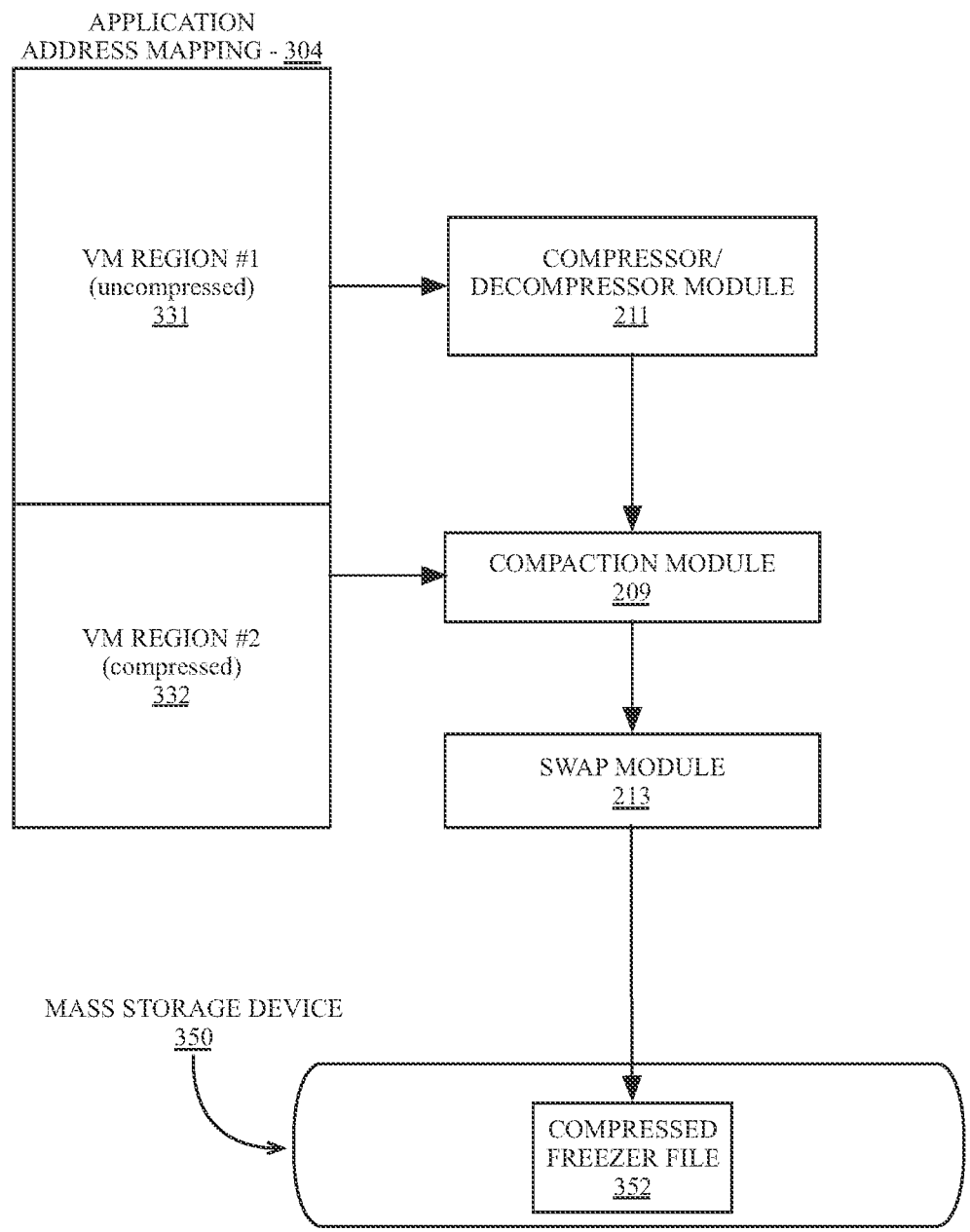
FIG. 3 is a block diagram illustrating components of a compressed memory management module configured to generate an application freezer file, according to an embodiment.

FIG. 3 is a block diagram illustrating components of a compressed memory management module configured to generate an application freezer file, according to an embodiment. In one embodiment, an application (e.g., application 223 of FIG. 2) has an application address mapping 304 in which a first region of virtual memory associated with an application is mapped to a first virtual memory (VM) region 331 stored in uncompressed memory and a second VM region 332 stored in compressed memory. When a signal to disable, hide, or otherwise stop using the application is received by the system, the system can partially disable the application and compact any memory stored in the second application VM region 332 via the compaction module 209.

In one embodiment, the compressed virtual memory of the second VM region 332 includes variable sized compressed data elements that are packed into fixed sized compacted memory segments by the compaction module 209. Additionally, the uncompressed virtual memory pages stored in the first VM region 331 can be compressed into compressed virtual memory pages by the compressor/decompressor module 211. The newly compressed virtual memory pages can be additionally compacted by the compaction module 209 into contiguous segments of compressed and compacted virtual memory (e.g., compacted virtual memory segments).

In one embodiment, the compacted virtual memory segments can be swapped to a mass storage device 350 by the swap module 213. In one embodiment, a mapping between the virtual memory addresses of the first VM region 331 and the second application VM region 332 is made to addresses on the mass storage device 350 that store corresponding locations within the application freezer file 352. Such mapping can be utilized to swap the memory stored in the compressed freezer file into system memory when the application is re-enabled.

Figure 4:
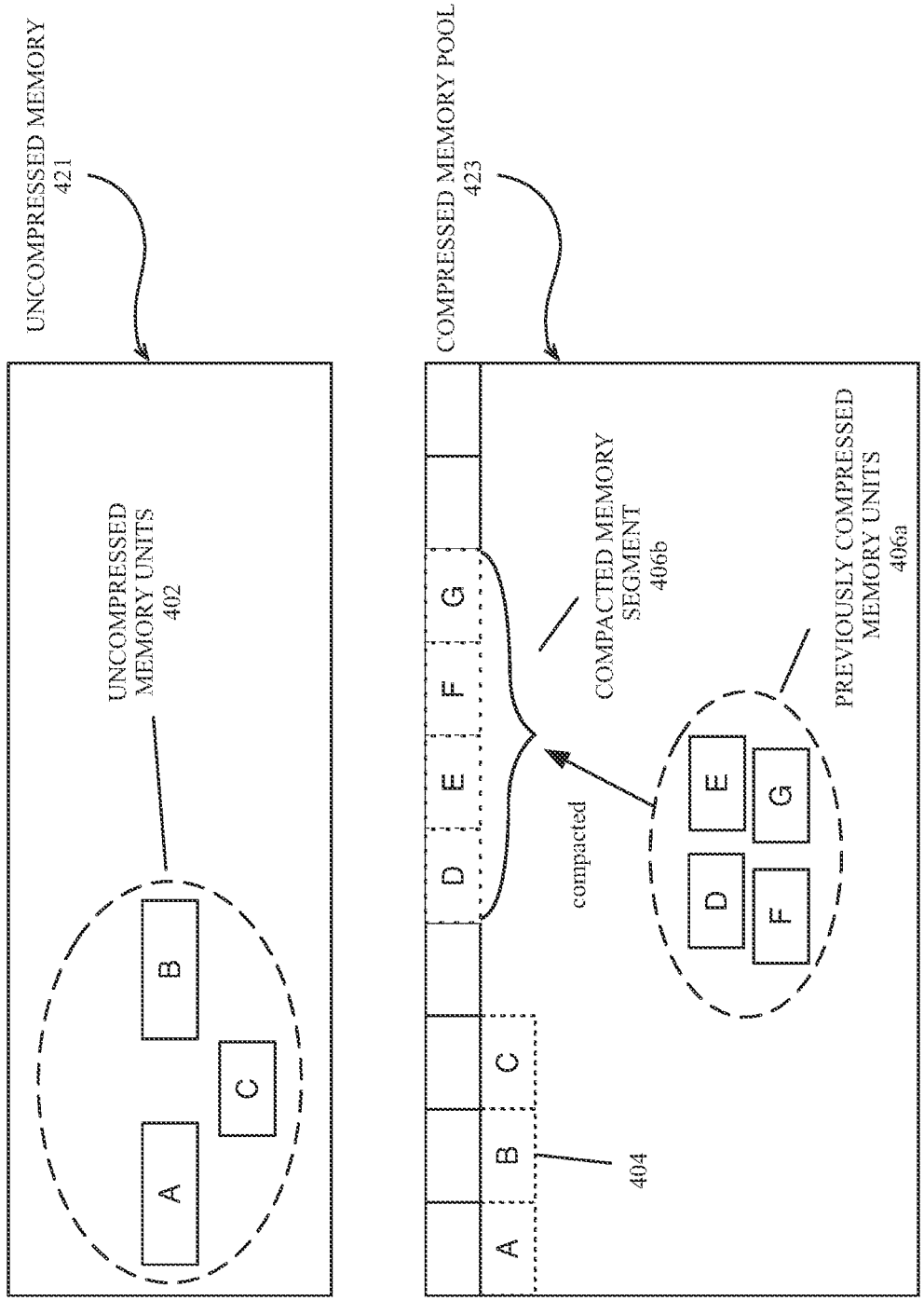
FIG. 4 is a block diagram illustrating compression and compaction of virtual memory, according to an embodiment.

FIG. 4 is a block diagram illustrating compression and compaction of virtual memory, according to an embodiment. In one embodiment, process memory associated with an application includes uncompressed memory units 402, such as uncompressed virtual memory pages (e.g., page A; page B; page C) within a region of uncompressed memory 421. The memory pages may be contiguous or non-contiguous and may be of varying sizes. The virtual memory associated with the executing application can also include one or more previously compressed memory units 406a in a compressed memory pool 423. The previously compressed memory units 406a include compressed data elements such as one or more virtual memory pages (e.g., page D; page E; page F; page G) that have been previously compressed by a compression module (e.g., compressor/decompressor module 211 of FIGS. 2-3).

The previously compressed memory units 406a may be in disjoint locations within the compressed memory pool 423 until, in one embodiment, the previously compressed memory units 406 are gathered and compacted by a compaction module (e.g., compaction module 209 of FIGS. 2-3). The compaction module can compact the previously compressed memory pages 406a (e.g., pages D-G) into one or more fixed size compacted memory segments 406b. In one embodiment, the previously compressed memory pages 406a can be compacted without decompressing or recompressing any pages of the previously compressed memory.

In such embodiment, the uncompressed memory pages 402 (e.g., pages A-C) associated with the application can also be compressed by a compressor/decompressor module and compacted into one or more fixed size compacted memory segments 404 in the compressed memory pool 423. In one embodiment, the compacted memory segments are sized to facilitate efficient I/O transfer within or between memory devices (e.g., within or between the system memory device 122 and the storage sub-system 130 of FIG. 1) during swap operations, for example to an from a compressed and compacted frozen memory file.

Figure 5:
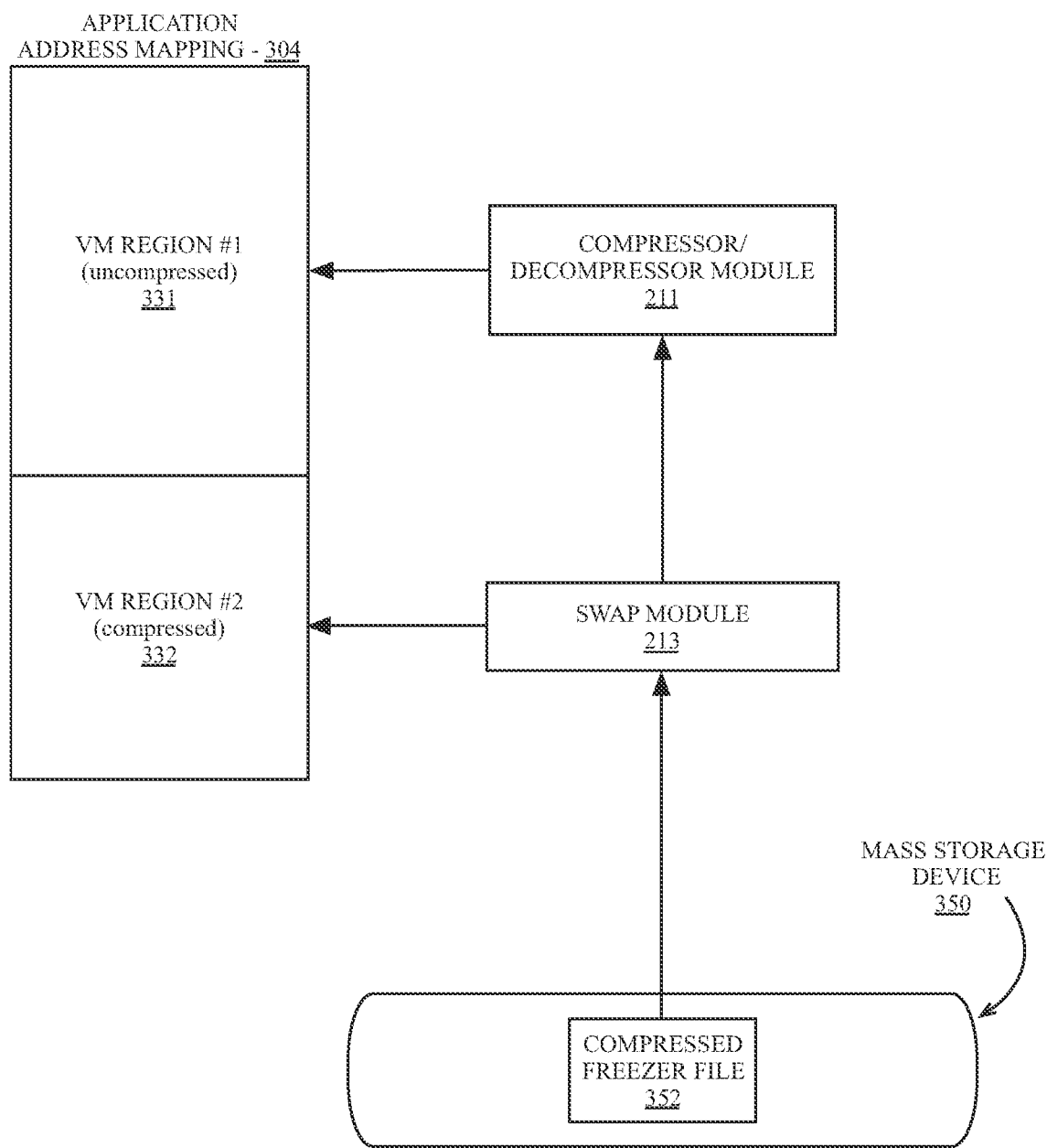
FIG. 5 is a block diagram illustrating the restoration of memory from an application freezer file, according to an embodiment.

FIG. 5 is a block diagram illustrating the restoration of memory from an application freezer file, according to an embodiment. A mapping between the virtual memory addresses associated with an application (e.g., application address mapping 304) and the first VM region 331 and the second VM region 332 can be made such that an access to virtual memory associated with the application can trigger a page fault, causing memory stored in the compressed freezer file 352 on the mass storage device 350 to be loaded into memory by the swap module 213. In such embodiment, the swap module 213 swaps compressed data elements in the compressed freezer file 352 into the appropriate VM region. In one embodiment, compacted memory segments storing compressed data elements that were compressed prior to receiving the request to deactivate or disable the application can be swapped back into the second VM region 332 in compressed form. Compacted memory segments storing compressed data elements that were uncompressed when the application was active can be swapped into the first VM region 331 in uncompressed form by accessing the compressor/decompressor module 211 during the swap operation.

Figure 6:
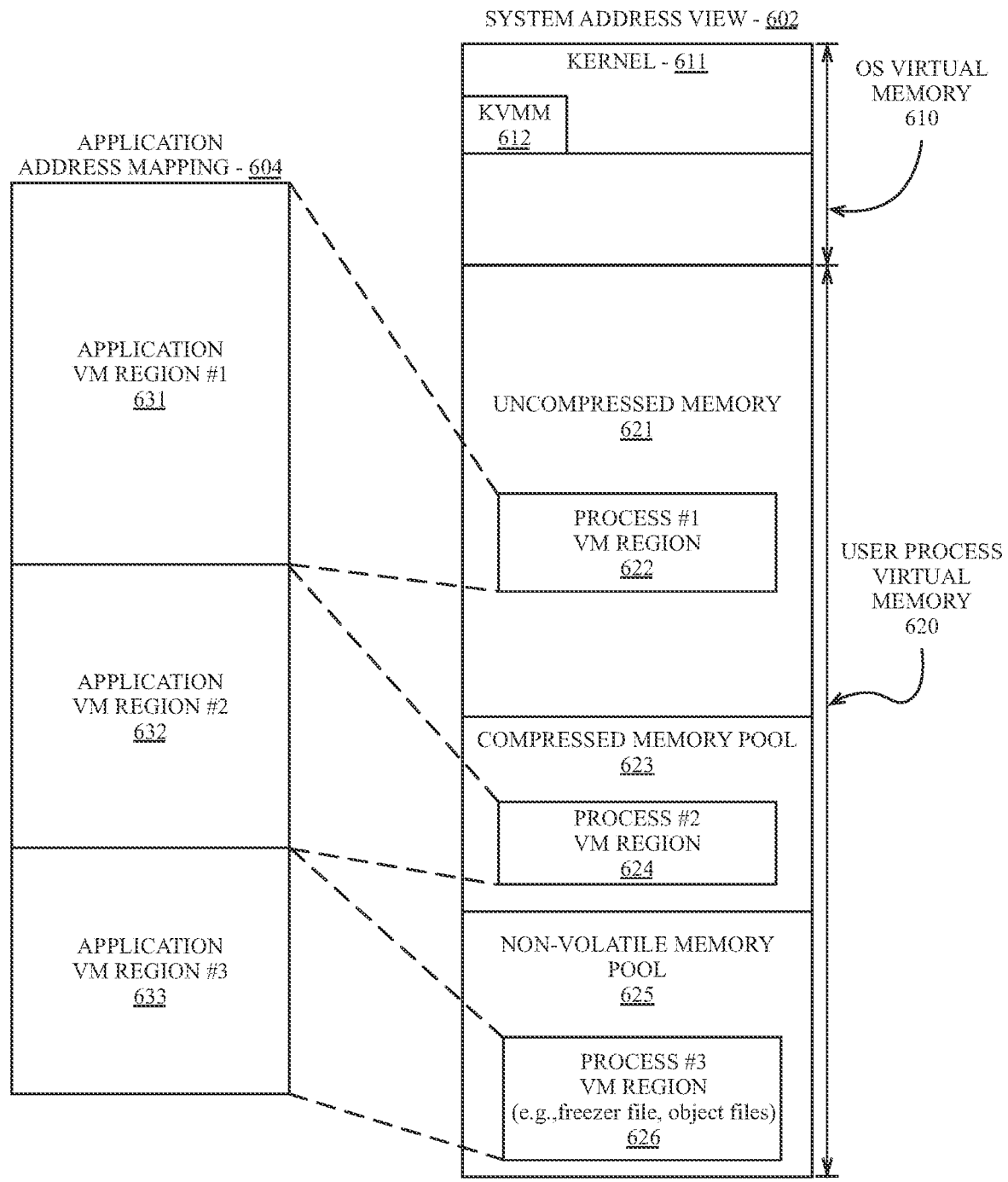
FIG. 6 is a block diagram illustrating an application and system virtual memory address view, according to an embodiment.

FIG. 6 is a block diagram illustrating an application and system virtual memory address view, according to an embodiment. The system address view 602 represents one view of virtual memory as understood by an operating system executing on one embodiment of a data processing system, which can differ from the view of virtual memory provided to each executing application (e.g., application address view 604). The operating system kernel 611, via the kernel virtual memory manager 612 can organize the system address view 602 of virtual memory to separate virtual memory allocations by the kernel virtual memory manager (KVMM) 612 based on whether the allocations are for use by the operating system (e.g., in OS virtual memory 610) or a user process (e.g. user process virtual memory 620). In one embodiment, allocations for OS virtual memory 610 are performed at higher address ranges than allocations for user applications, which are performed in user process virtual memory 620.

In one embodiment the user process virtual memory 620 includes uncompressed memory 621 that stores active regions of memory for executing applications, a compressed memory pool 623 to which uncompressed memory can be copied and compressed and/or compacted, and a non-volatile memory pool 625 that contains virtual memory addresses that are mapped to one or more non-volatile storage devices. While each region of user process virtual memory 620 is illustrated as contiguous, embodiments are not limited as such, as regions may also be non-contiguous in system virtual memory.

In one embodiment, an application address view 604 includes application virtual memory regions that can be mapped to address regions in user process virtual memory 620 of the system address view 602 by the KVMM 612. In one embodiment, a first application VM region 631 storing active application data can be mapped to a first process VM region 622 in uncompressed memory 621. A second application VM region 632 storing application data that is not currently in use can be mapped to a second process VM region 624 in a compressed memory pool 623. A third application VM region 633 storing application data (e.g., object files) that have not yet been loaded into memory, or portions of application memory stored in a compressed freezer file, can be mapped to a third process VM region 626 in the non-volatile memory pool 625.

Figure 7:
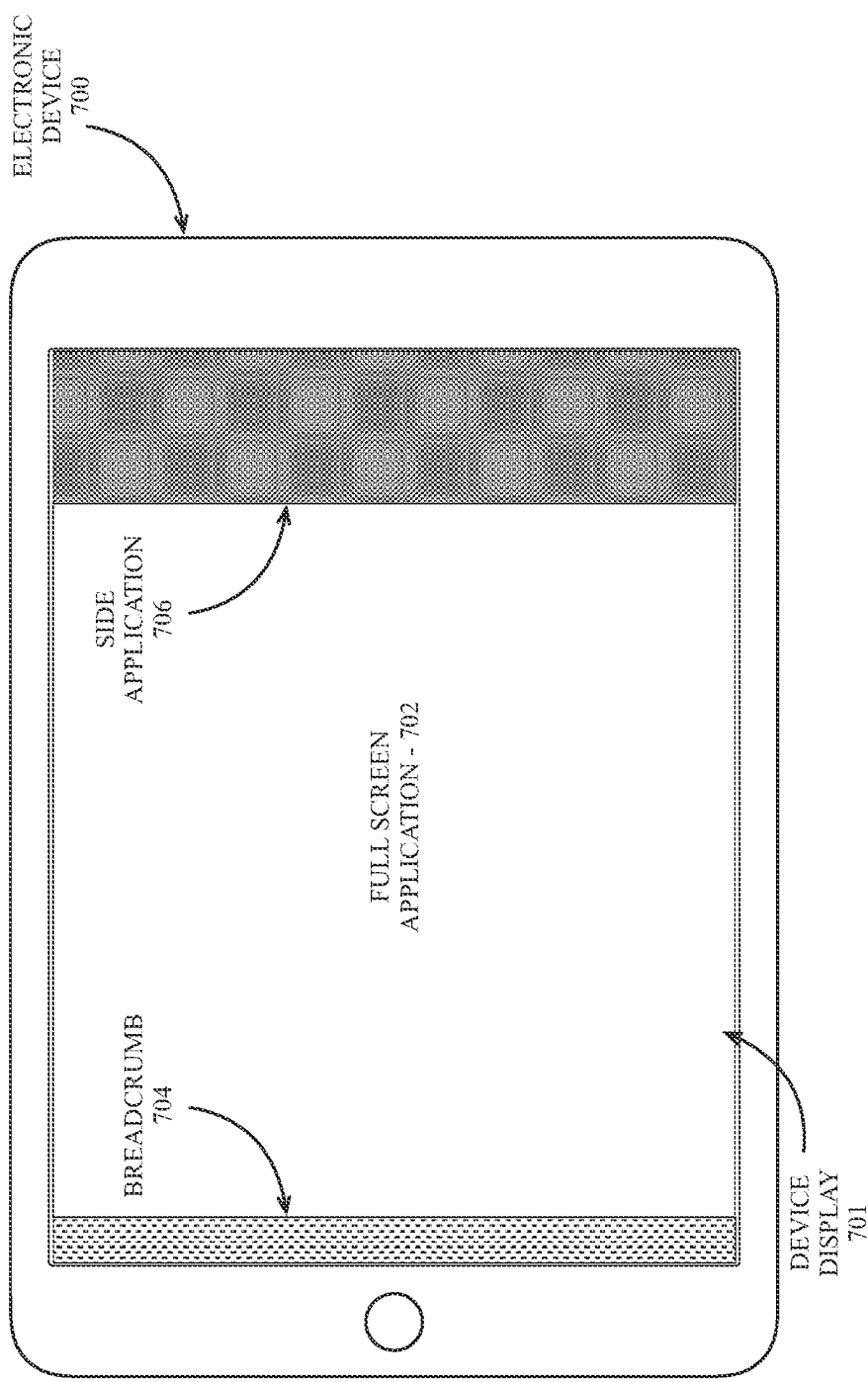
FIG. 7 is an illustration of an electronic device with support for primary and secondary applications, according to an embodiment.

FIG. 7 is an illustration of an electronic device 700 with support for primary and secondary applications, according to an embodiment. In such embodiment, the memory for secondary applications may be stored in a compressed freezer file when the secondary applications are requested to be hidden or disabled. The electronic device 700 can include a device display 701 to display a user interface for an operating environment (e.g., operating environment 201 of FIG. 2), including display output for any executing applications.

The electronic device can be configured to display multiple applications, including a primary application such as a full screen application 702, which is generally configured to use the entire display 701 of the electronic device 700, and one or more secondary applications including a side application 706, which can be configured by the operating environment to display along side of, or as an partial overlay on top of the full screen application 702. In one embodiment, in response to an indication from a user to hide or disable the side application 706, the side application 706 can be partially disabled and the memory for the application can be stored in a compressed freezer file for the application.

In one embodiment, a secondary application can be linked from a breadcrumb 704 displayed on the display device 701 next to the full screen application 702. The breadcrumb 704 can provide a link to a second full screen application. For example, the full screen application 702 may be a map or navigation application that was opened after following a link from a web browser. The map or navigation application may then display a breadcrumb 704 to enable a user to return to the web browser from the navigation application. The operating environment for the electronic device 700 can be configured to freeze the memory for the application linked by the breadcrumb 704 (e.g., web browser) while the full screen application 702 (e.g., map or navigation application) is active. If the user elects to follow the breadcrumb 704 to return to the linked application, the memory for the linked application can be swapped into memory from the compressed freezer file. While an application's memory is frozen in a compressed freezer file, the application (e.g., the application linked from the breadcrumb 704, or a disabled or hidden side application 706) can be placed into a protected state to prevent a memory usage management module from terminating the application to reclaim the application's memory. In one embodiment, once the memory for a secondary application is stored in a compressed freezer file, the physical memory allocation for the application can be released or re-allocated. Thus, terminating a frozen application provides little to no additional physical memory to the physical memory pool.

The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

Figure 8:
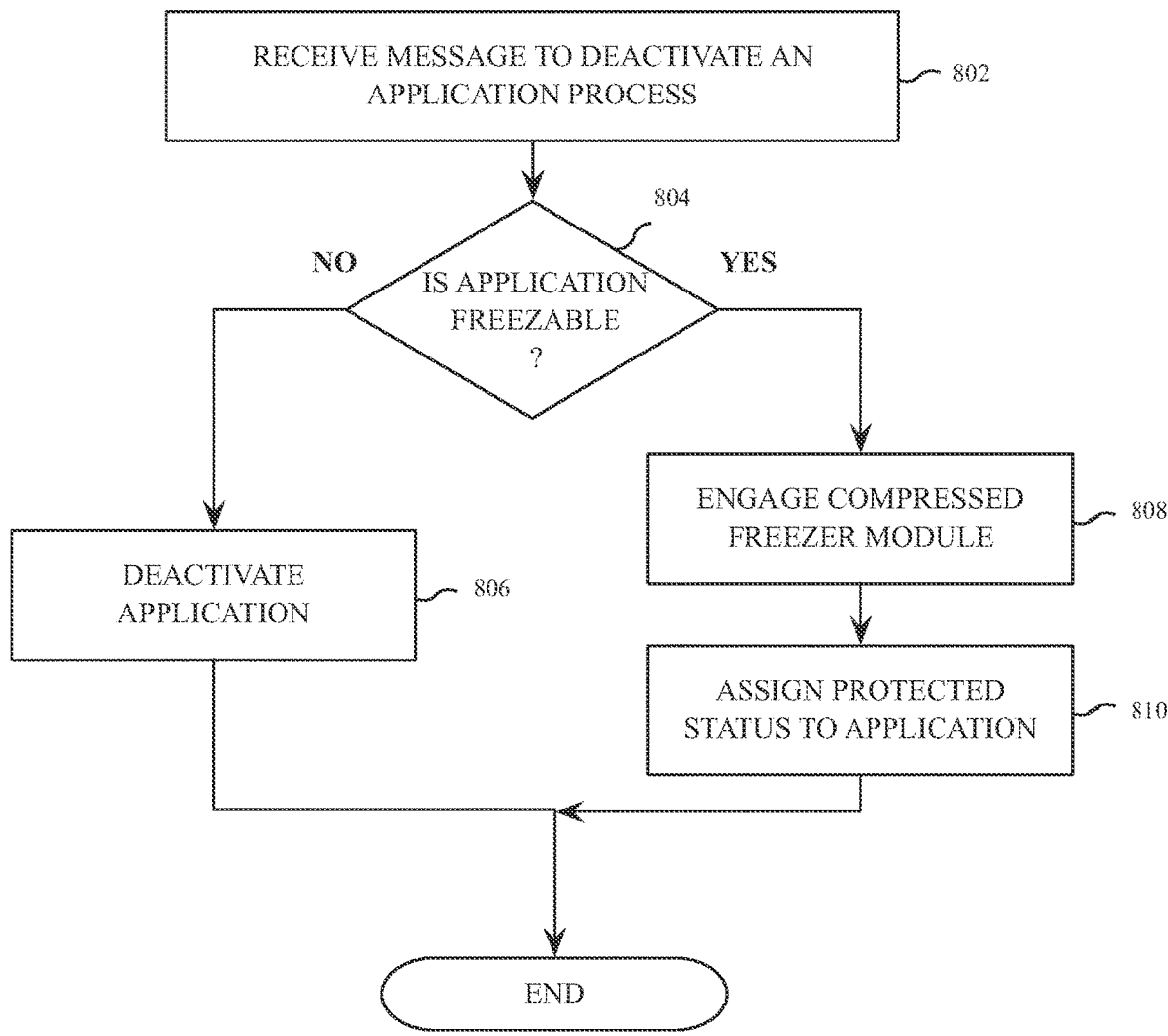
FIG. 8 is a flow diagram of logic within an operating environment to handle messages to deactivate an application process, according to an embodiment.

FIG. 8 is a flow diagram of logic within an operating environment to handle messages to deactivate an application process, according to an embodiment. In one embodiment, the operating environment of a data processing system can receive a message, as shown at block 802, indicating that a process associated with a secondary application (e.g., a breadcrumb linked application, a side application, etc.) is to be hidden, disabled, sent to the background, or otherwise will no longer be an active and/or visible process on a display of an electronic device. The operating environment can determine, as shown at block 804, whether the application is a freezable application that supports, for example, temporary suspension of operations while the memory associated with one or more processes or threads of the application memory are compressed, compacted, and stored. If the application is not a freezable application as determined at block 804, the operating environment may disable the application, as shown at block 806.

In one embodiment if the application is a freezable application, as determined at 804, the operating environment can engage a compressed freezer module including a compaction, compressor/decompressor module, and/or a swap module, to compress, compact, and store the memory of the application process, as shown at block 808. Once the compressed freezer file is stored, the operating environment may release or re-allocate the physical memory backing the application virtual memory. In one embodiment, the operating environment can assign a protected status to the application, as shown at block 810, to prevent a memory usage status module, low memory handler, or other memory management module from terminating or fully disabling the frozen application to reclaim the virtual memory allocations associated with the frozen application.

Figure 9:
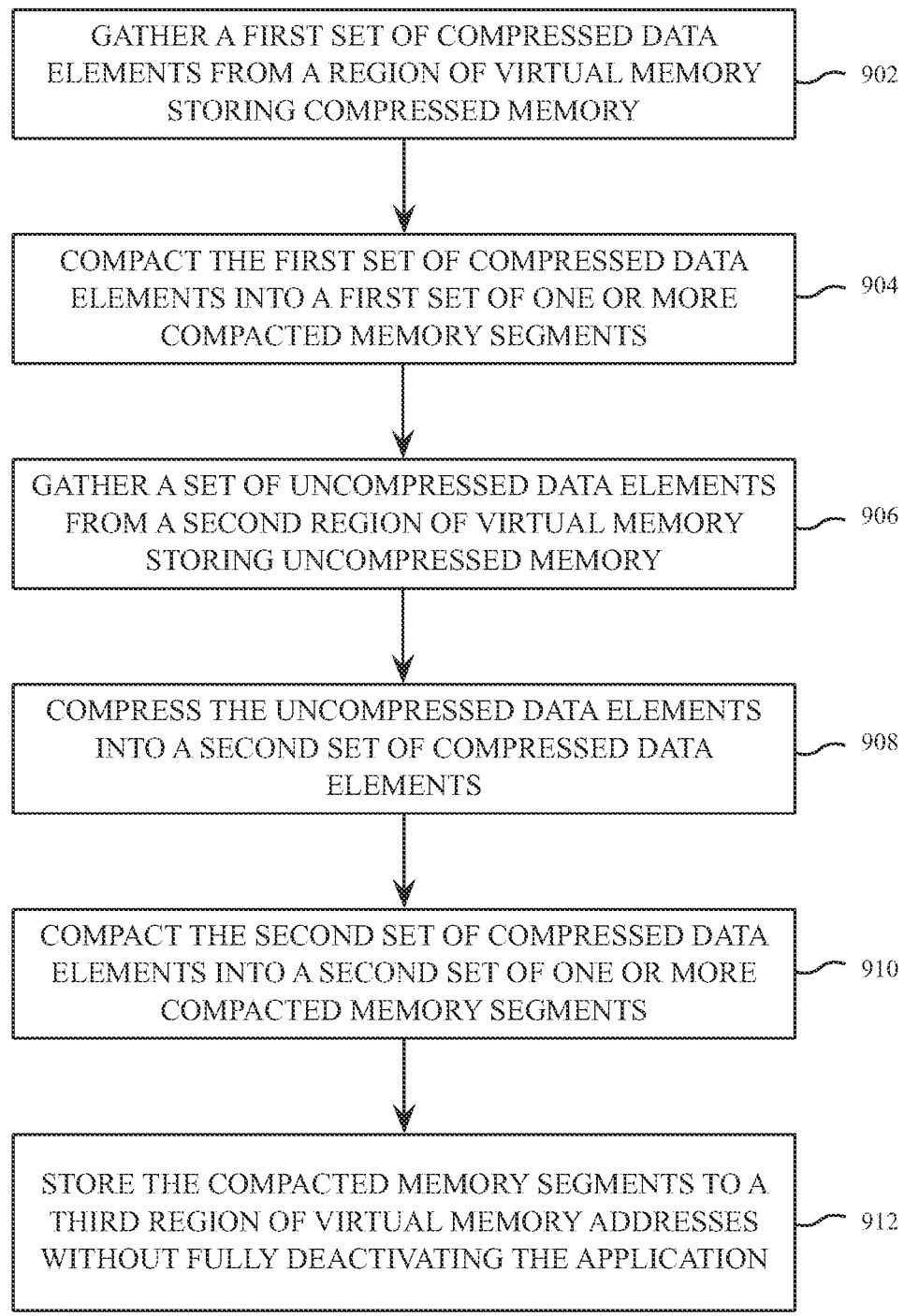
FIG. 9 is a flow diagram of logic to create a compressed memory freezer file, according to an embodiment.

FIG. 9 is a flow diagram of logic to create a compressed memory freezer file, according to an embodiment. In one embodiment, in response to the logic indicated in FIG. 8, a virtual memory manager of a data processing system can gather a first set of compressed data elements from a first region of virtual memory storing compressed memory, as shown at block 902. In one embodiment the first region of application virtual memory can be a compressed virtual memory pool storing compressed data elements associated with several applications, processes, and/or threads. In such embodiment, the compressed data elements specifically for the processes and threads associated with the secondary application are gathered from the compressed memory pool. In one embodiment, the first set of compressed data elements were compressed by the virtual memory manager prior to the message to generate the compressed freezer file for the application or process.

As shown at block 904, the virtual memory manager can engage a compaction module to compact the first set of compressed data elements from the first region of memory into a first set of one or more compacted memory segments. In one embodiment, the compaction module compacts the compressed data elements without decompressing any of the previously compressed data elements. In one embodiment, the compressed data elements are variable sized data elements. In one embodiment, multiple variable sized data elements can be included in a single virtual memory page or can occupy one or more virtual memory pages. The compressed data elements can be compacted into compacted memory segments, which are fixed sized memory segments that are sized for efficient transfer within or between memory devices.

In one embodiment, as shown at block 906, the virtual memory manager can gather a set of uncompressed data elements from a second region of application virtual memory that stores uncompressed memory. The uncompressed data elements, in one embodiment, include active virtual memory pages storing executable instructions and data for a process or thread of the application. The virtual memory pages for the application can be gathered from various, disjoint locations in memory. In one embodiment, pointers to the disjoint virtual memory pages can be gathered in a container in kernel virtual memory address space and the container can be supplied to a compressor/decompressor module, which, as shown at block 908, can compresses the uncompressed data elements into a second set of compressed data elements. In one embodiment, the compressor/decompressor module compresses the uncompressed data elements into the second set of compressed data elements in conjunction with swapping the uncompressed data elements into the compressed memory pool.

In one embodiment, the compaction module can be engaged to compact the second set of compressed data elements into a second set of one or more compacted memory segments, as shown at block 910. In one embodiment, the compaction module reads the second set of compressed data elements from the compressed memory pool after the second set of data elements are swapped to compressed memory. In one embodiment, the compressor/decompressor module delivers the second set of compressed data elements to the compaction module and the compressed data elements are compacted directly into the second set of one or more compacted memory segments.

In one embodiment, as shown at block 912, the first and second set of compacted memory segments can be stored to a third region of virtual memory. In one embodiment, the third region of virtual memory is mapped to one or more non-volatile memory devices, such as a set of one or more flash memory devices, and the compacted memory segments are stored via a swap module. The swap can be performed without fully deactivating the application, or processes associated with the application, such that the application remains in a semi-active but frozen state. For example, the application process can remain on a list of active tasks but does not perform operations while partially deactivated. In one embodiment, the system process scheduler can freeze an application process by not scheduling the process. While the process is frozen, the physical memory backing the virtual memory of the application can be reclaimed. However, in one embodiment the virtual memory allocations associated with the frozen application can remain in place, allowing memory used by processes and/or threads of the application to be quickly restored to memory when the application is reactivated.

Figure 10:
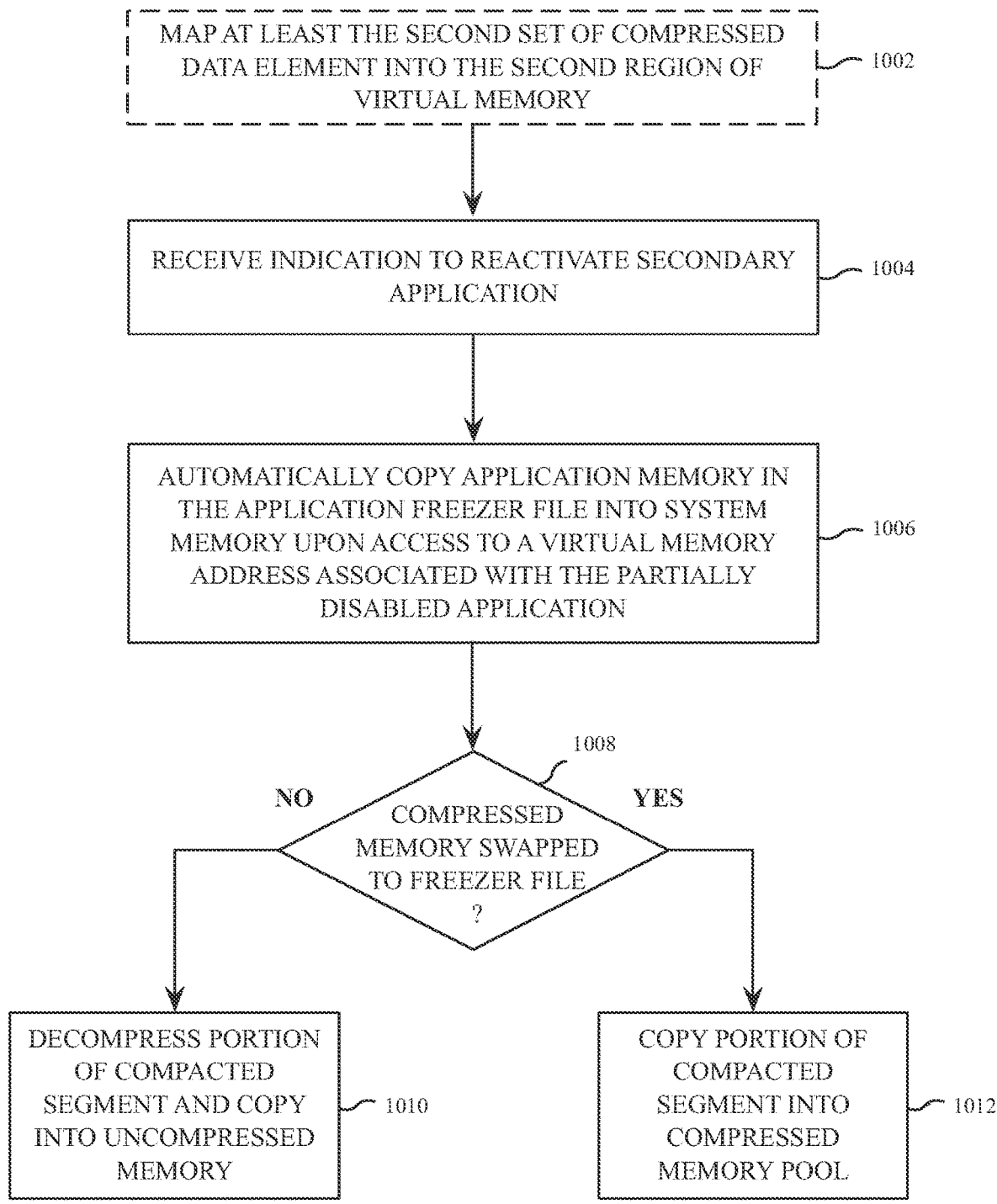
FIG. 10 is a flow diagram illustrating logic to restore memory from a compressed freezer file, according to an embodiment.

FIG. 10 is a flow diagram illustrating logic to restore memory from a compressed freezer file, according to an embodiment. In one embodiment, as shown at block 1002, one or more processors of the electronic device can be configured to maintain a mapping between storage addresses or offsets within the compressed freezer file and the previously used system memory addresses for at least the second set of compacted memory segments, which are the compacted memory segments from the uncompressed memory region. However, a mapping can be maintained for the compressed memory region, as well as an application memory region mapped to a non-volatile memory pool. In one embodiment, the mapping can determine, upon application or process re-activation, the addresses to which the various portions of the compressed freezer file are to be restored.

For example, when the operating environment for an electronic device receives an indication to reactivate one or more threads or processes associated with a partially deactivated secondary application, as shown at block 1004, the operating environment may access virtual memory addresses associated with the secondary application. In one embodiment, the access triggers a page fault which causes the virtual memory system of the device to automatically swap portions of the application memory stored in the application freezer file into system memory, as shown at block 1006.

In one embodiment, the swap can be to compressed or uncompressed memory. For example, application memory in the compressed memory pool can be restored to the compressed memory pool. Application memory in uncompressed memory can be restored to uncompressed memory. If the compressed memory is swapped to the freezer file, as determined at block 1008, a swap module can simply copy a portion of a compacted memory segment into a location in the compressed memory pool for the virtual memory system, as shown at block 1012. If the swap is to uncompressed memory, a compressor/decompressor module can be used to decompress a portion of a compacted memory segment (e.g., a compressed data element) and copy the resulting uncompressed data element into uncompressed memory, as shown at block 1010. Once the working set of the application is restored to memory, the application can be restored to functionality, which can include displaying the application as a full screen application (e.g., breadcrumb navigation) or as a side application along side of, or as a partial overlay on a full screen application.

Exemplary Data Processing System Architecture

Figure 11:
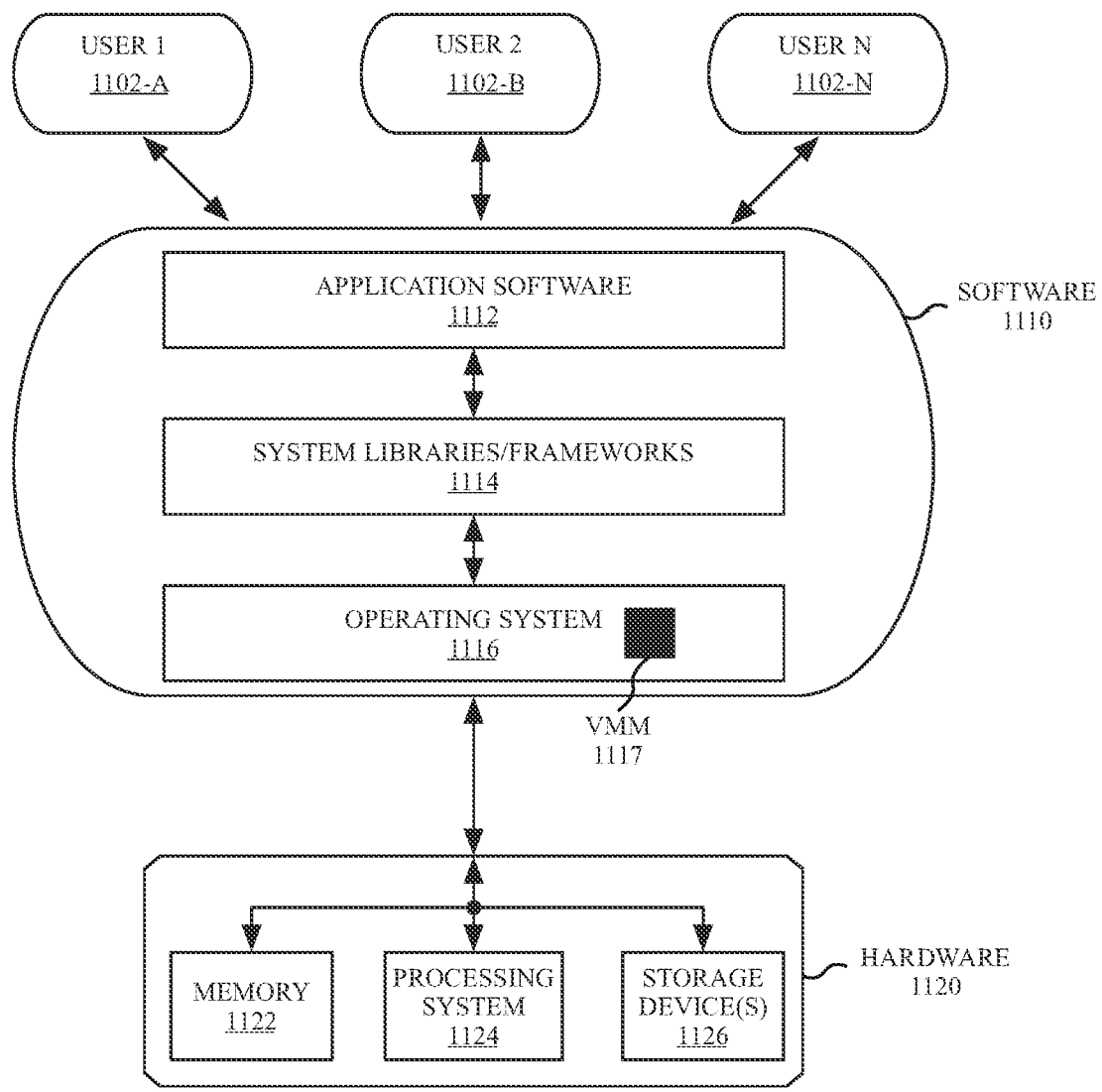
FIG. 11 is a block diagram of system software architecture for a multi-user data processing system, according to an embodiment.

FIG. 11 is a block diagram of system architecture for a multi-user data processing system, according to an embodiment. The data processing system includes various software 1110 and hardware 1120 components configured to support multi-user data processing for 1 to N user accounts (e.g., User 1 1102-A, User 2 1102-B, User N 1102-N). In one embodiment, software 1110 of the system can be used to implement a variant of the operating environment 201 of FIG. 2. The hardware 1120 can be configured with components to provide a virtual memory system, such as the virtual memory system shown in FIG. 1. Processes associated with each user account can access application software 1112 through a user interface provided by an operating system (OS) 1116, including components further illustrated in FIG. 12. The hardware 1120 of the data processing system can include one or more memory devices 1122, a processing system 1124 including one or more processors, and one or more storage devices 1126, as further illustrated in FIGS. 13-14.

A virtual memory manager VMM 1117 can provide memory management services, such as virtual memory mapping and paging. The operating system 1116 can configure the VMM 1117 to map addresses on the storage devices 1126 into memory, for example, to load binary objects for application software 1112 or system libraries or frameworks 1114, or to store or load compressed and compacted memory to or from a compressed freezer file, according to embodiments described herein.

Figure 12:
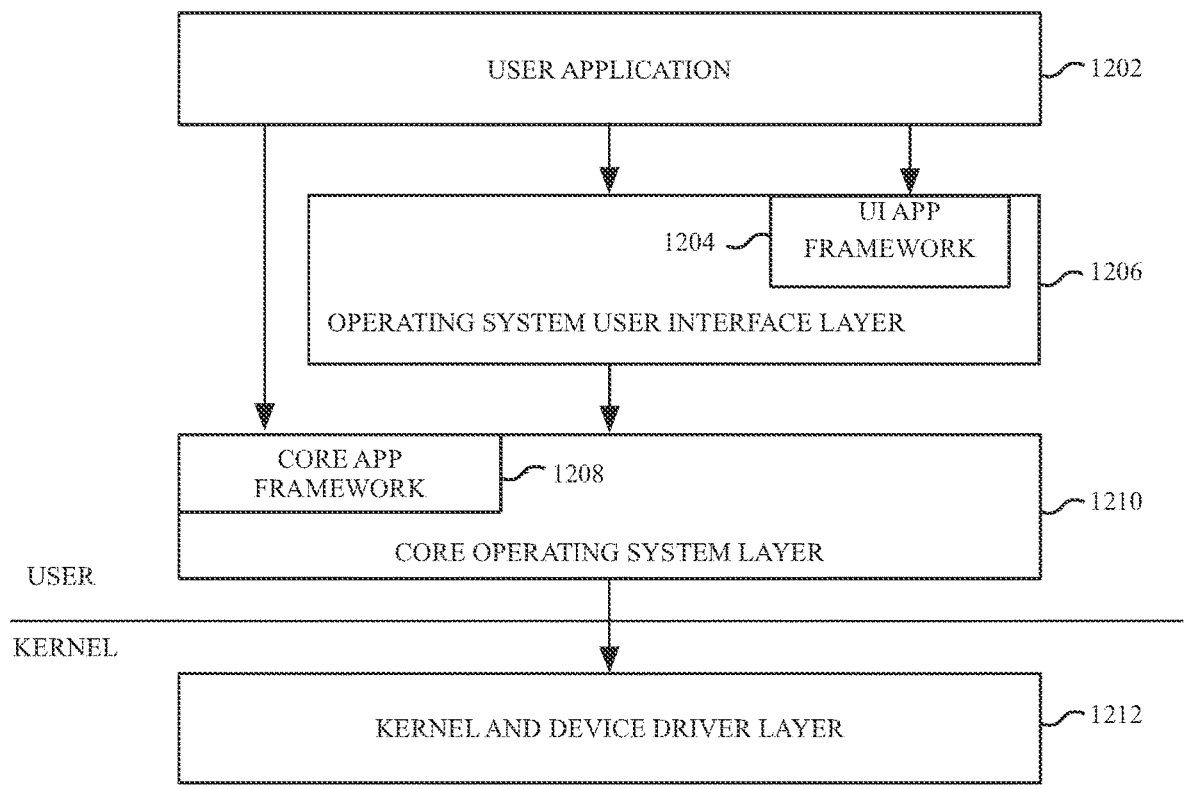
FIG. 12 is a block diagram of a multi-layer software architecture used by a data processing system, according to an embodiment.

FIG. 12 is a block diagram of a multi-layer software architecture used by a data processing system, according to an embodiment. The software components are illustrated with a division between user space and a kernel space. Although other arrangements are possible, user applications (e.g., user application 1202), and some operating system components (e.g., operating system user interface layer 1206, and the core operating system layer 1210) execute in user space. In kernel space, the operating system kernel and a set of device drivers operate in the kernel and device driver layer 1212. The kernel and device driver layer 1212 manage the underlying functionality of the overall operating system and provide a formalized and secure mechanism for user space software to access data processing system hardware.

A user interface (UI) application framework 1204 provides a mechanism for the user application 1202 to access UI services provided by the operating system (OS) UI layer 1206. Underlying operating system functions that are not related to the user interface are performed in the core operating system layer 1210. One or more data management frameworks, such as a core app framework 1208 can be made available to a user application to facilitate access to operating system functions.

The exemplary user application 1202 may be any one of a plurality of user applications, such as a web browser, a document viewer, a picture viewer, a movie player, a word processing or text editing application, an email application, or other applications known in the art. The user application 1202 accesses instructions in an exemplary UI app framework 1204 for creating and drawing graphical user interface objects such as icons, buttons, windows, dialogs, controls, menus, and other user interface elements. The UI application framework 1204 also provides additional functionality including menu management, window management, and document management, as well as file open and save dialogs, drag-and-drop, and copy-and-paste handling.

The core operating system layer 1210 contains operating system components that implement features including and related to application security, system configuration, graphics and media hardware acceleration, and directory services. Multiple application frameworks, including the core app framework 1208, provide a set of APIs to enable a user application 1202 to access core services that are essential to the application, but are not directly related to the user interface of the application. The core app framework 1208 can facilitate an application's access to database services, credential and security services, backup services, data synchronization services, and other underlying functionality that may be useful to an application.

The core app framework 1208, or equivalent application frameworks, can provide access to remote server based storage for functionality including synchronized document storage, key-value storage, and database services. Key-value storage allows a user application 1202 to share small amounts of data such as user preferences or bookmarks among multiple instances of the user application 1202 across multiple client devices. The user application 1202 can also access server-based, multi-device database solutions via the core app framework 1208.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 13:
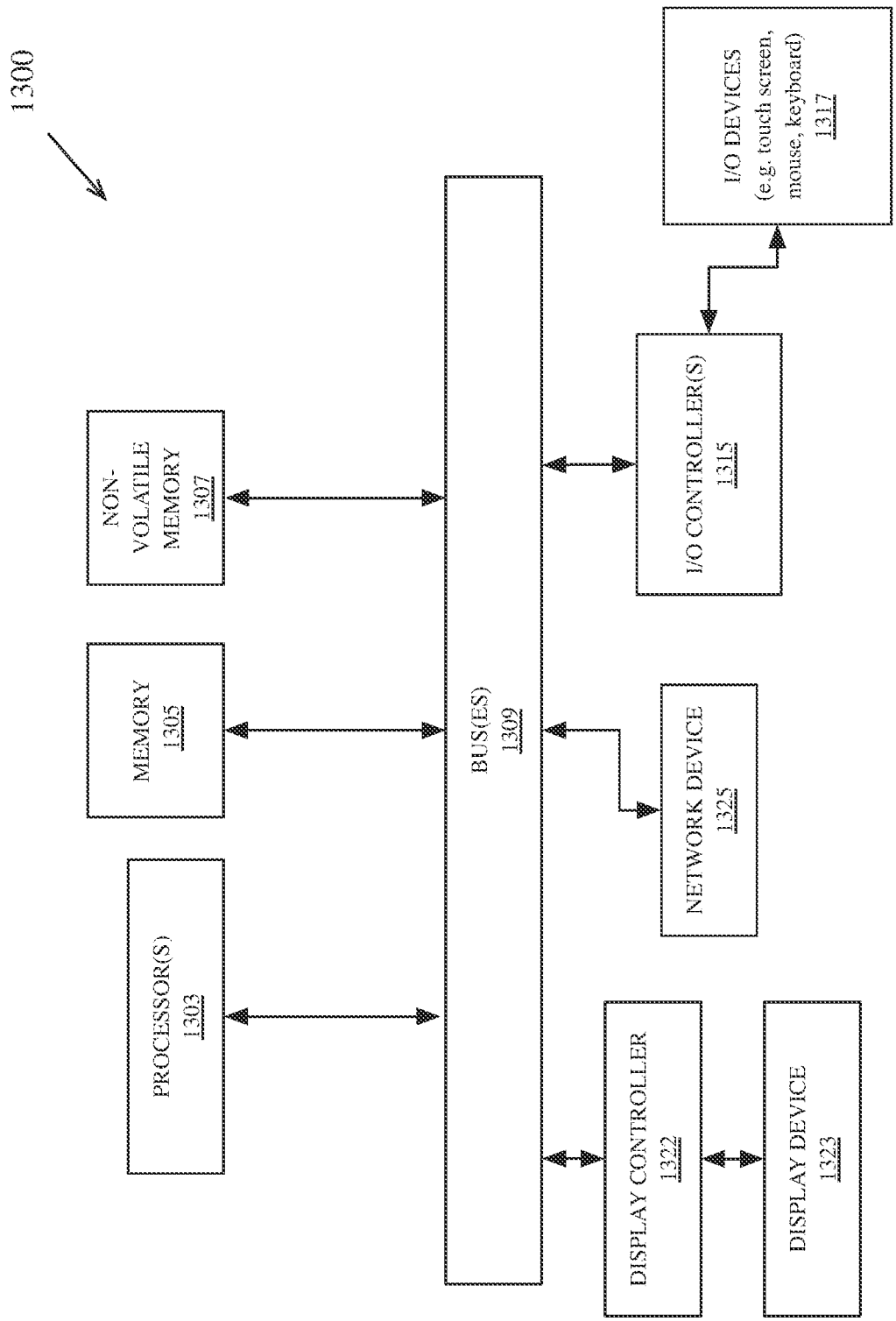
FIG. 13 is a block diagram of data processing system hardware according to an embodiment.

FIG. 13 is a block diagram of data processing system hardware according to an embodiment. Note that while FIG. 13 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown in FIG. 13 can also be used with the present invention.

As shown in FIG. 13, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1311 is coupled to the one or more buses 1309 in order to receive display data to be displayed on a display device 1313 which can display any one of the user interface features or embodiments described herein. The display device 1313 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 13 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 925 can be coupled to the bus(es) 1209. The network device(s) 925 can be wired network devices (e.g., Ethernet) or wireless network devices (e.g., WI-FI, Bluetooth).

Figure 14:
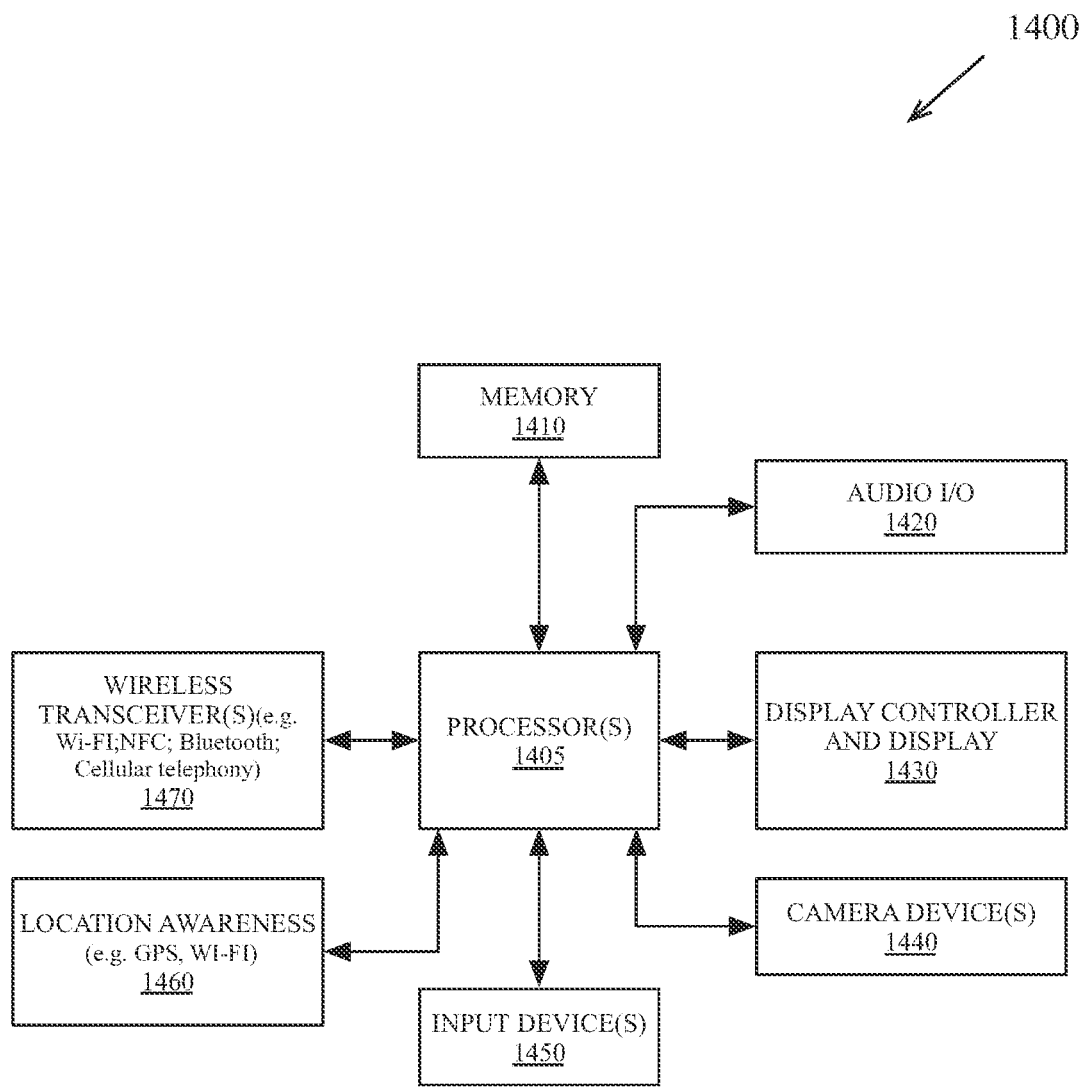
FIG. 14 is a block diagram of an additional data processing system, according to an embodiment.

FIG. 14 is a block diagram of an additional data processing system, according to an embodiment. The data processing system illustrated can include hardware components that are optimized for use in mobile or handheld devices, and may be included within a system on a chip integrated circuit. One or more buses or interfaces that are not shown can be used to interconnect the various components, as known in the art. An electronic device constructed using the illustrated data processing system may include additional or fewer components than shown.

The system can include a processing subsystem having one or more processor(s) 1405 and memory 1410 for storing data and programs for execution by the processing system 1405. An audio I/O subsystem 1420 can also be included. The Audio I/O subsystem 1420 can include a microphone and a speaker for telephone or video conferencing or for the recording and playback of music.

A display controller and display device 1430 can be included to provide a graphical user interface for the user, and a wireless transceiver 1470 may be available to transmit and receive data via one or more wireless technologies, such as Wi-Fi, infrared, Bluetooth, or one or more additional forms of wireless radio technology such as near field communication (NFC). The system can contain one or more camera devices 1440 in both a front and rear facing configuration, though similarly configured systems each with only a front facing camera or rear facing camera can be one of many optimal configurations. The data processing system also includes one or more input devices 1450 to enable a user to provide input to the system. Input devices may include a keypad or keyboard, alone or in conjunction with a touch or multi touch panel that is overlaid on the display device 1430. In one embodiment, the display device and touch panel can be adjusted in real time using factory-generated calibration data. The data processing system can also include a device for providing location awareness services 1460, such as a Global Positioning System (GPS) device or its equivalent, WI-FI location awareness, or an equivalent service.

It will be apparent from this description that aspects of the present invention may be embodied, at least in part, in software. That is, the techniques may be carried out in a data processing system in response to its processor executing a sequence of instructions contained in a storage medium, such as embody a non-transitory machine-readable storage medium. In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

In various embodiments, a virtual memory system for mobile and handheld electronic devices is disclosed in which, in one embodiment, the lack of a traditional backing store or swap file can be remedied by compacting and storing memory into a compacted and compressed 'freezer file.' The following is exemplary as to certain embodiments described herein. Specifics in the given examples may be used anywhere in one or more embodiments. The various features of the different embodiments or examples thereof may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein. Various components can be a means for performing the operations or functions described.

One embodiment provides for a method comprising gathering a first set of compressed data elements from a first region of virtual memory addresses; gathering a set of uncompressed data elements from a second region of virtual memory addresses, the first and second regions of virtual memory addresses associated with a process; compacting the first set of compressed data elements into a first set of compacted memory segments; compressing the uncompressed data elements into a second set of compressed data elements; compacting the second set of compressed data elements into a second set of compacted memory segments; and storing the first and second set of compacted memory segments to a third region of virtual memory addresses.

In a further embodiment, the method additionally comprises receiving a request to deactivate the process; gathering the first set of compressed data elements in response to the request, wherein the first set of compressed data elements include one or more data elements compressed prior to the request; and partially deactivating the process after storing the first and second set of compacted memory addresses to the third region of virtual memory addresses.

In a further embodiment, the method additionally comprises protecting the process from termination by a low memory handler while the process is partially deactivated. In one embodiment, the method additionally comprises initializing a virtual memory space for an application, the initializing comprising mapping first region and the second region of virtual memory addresses to a region of system memory, the first region of virtual memory addresses mapped to a compressed memory pool in the region of system memory. In one embodiment, the third region of virtual memory is mapped to one or more non-volatile storage devices.

In one embodiment a non-transitory computer-readable medium stores instructions for an operating environment of a data processing system to generate, via one or more processors, an application specific compressed and compacted memory freezer file via operations comprising gathering a first set of compressed data elements from a first region of virtual memory addresses. The first region of virtual memory addresses can be associated with a compressed memory pool, and the gathering can be in response to a request to deactivate an application process on a mobile or handheld device. The compressed data elements that are gathered from the compressed memory pool are associated with or are specific to the application process.

In one embodiment, the medium includes additional instructions to cause the operating environment, via the one or more processors, to compact the first set of compressed data elements into a first set of one or more compacted memory segments after gathering the compressed data elements. The instructions can additionally cause the gathering of a set of uncompressed data elements from a second region of virtual memory addresses. The set of uncompressed data elements gathered from uncompressed memory continue to be associated with the application process.

In one embodiment, the instructions cause the performance of additional operations including compressing the uncompressed data elements into a second set of compressed data elements, compacting the second set of compressed data elements into a second set of one or more compacted memory segments, and storing the first and second set of compacted memory segments to a third region of virtual memory addresses not associated with the application process. Storing the compacted memory segments to the third region of virtual memory addresses can be performed without fully deactivating the application process. For example, the application process can remain on a list of active tasks while in a frozen or partially deactivated state.

In one embodiment the gathering of the first set of compressed data elements is performed in response to a request to deactivate the process. The first set of compressed data elements can include one or more data elements compressed prior to the request. One embodiment provides for further operations including compacting the first set of compressed data elements without decompressing any of previously compressed data elements. In one embodiment the data elements include one or more virtual memory pages. In one embodiment, compacted memory segments are fixed size segments including a variable number of compressed virtual memory pages.

One embodiment provides for additional operations including partially deactivating the process and protecting the process from termination by a low memory handler while the process is partially deactivated. In one embodiment, the first region and the second region of virtual memory are mapped to system memory. In such embodiment, the first region of virtual memory can be mapped to a compressed memory pool in system memory. In one embodiment, the third region of virtual memory is mapped to one or more non-volatile storage devices. One embodiment provides for additional operations comprising, in response to a request to reactivate the process, decompressing the second set of compressed data elements into the second region of virtual memory.

In one embodiment, a virtual memory system includes one or more processors coupled to a memory device, where the memory device is configured to store a compressed memory pool that is dynamically mapped to a first region of virtual memory addresses and an uncompressed memory pool that is dynamically mapped to a second region of virtual memory addresses. The system can additionally include a storage device that is coupled to the one or more processors. The storage device can have storage addresses that are dynamically mapped to a third region of virtual memory addresses. In one embodiment, the storage device is configured to store a first and second set of compacted memory segments associated with a partially deactivated process. In one embodiment, the one or more processors of the system are further configured to map at least the second set of compacted memory segments into the second region of virtual memory in association with a request to reactivate the partially deactivated process.

In one embodiment, the first set of compacted memory segments on the storage device includes one or more data elements compressed before the process was partially deactivated and the second set of compacted memory segments were compressed and compacted contemporaneously to the partial deactivation of the process. In one embodiment, the storage device is further to store the first and second set of compacted memory segments within a file on the storage device. In one embodiment, the one or more processors of the virtual memory system are to map at least the second set of compacted memory segments into the second region of virtual memory via a virtual memory management module configured to cause at least the second set of compacted memory segments to be decompressed when the memory segments are paged in to the second region of virtual memory.

In one embodiment the one or more processors are to map the first set of compacted memory segments into the first region of virtual memory via a virtual memory management module without decompressing the memory segments. In one embodiment, a virtual memory management module protects the partially deactivated process from termination while the process is partially deactivated. In various embodiments described herein, the storage device can be a non-volatile electrically erasable semiconductor memory device.

In one embodiment, an electronic device includes one or more processors coupled to a bus and a memory device that is also coupled to the bus. The memory device can be configured to store a process for execution by the one or more processors, where the process is flagged as a process to be protected from termination after the process is partially deactivated. In one embodiment, the process is partially deactivated after the one or more processors perform operations to gather a first set of compressed data elements from a first region of virtual memory addresses, and the first set of compressed data elements associated with the process and compact the first set of compressed data elements into a first set of one or more compacted memory segments. The one or more processors can be further configured to gather a set of uncompressed data elements from a second region of virtual memory addresses, where the set of uncompressed data elements are associated with the process, and compress the uncompressed data elements into a second set of compressed data elements. The second set of compressed data elements can be compacted into a second set of one or more compacted memory segments, and the one or more processors can store the first and second set of compacted memory segments to a third region of virtual memory addresses. In one embodiment, after the compacted memory segments are stored, the device can request a partial deactivation of the process. In one embodiment, the physical memory of the partially deactivated process is released or re-allocated while the process is partially disabled, while the virtual memory allocations of the process remain in place.

In one embodiment, the electronic device further comprises one or more storage devices including a non-volatile electrically erasable semiconductor memory device, wherein the third region of virtual memory addresses is mapped to a set of storage addresses on the non-volatile electrically erasable semiconductor memory device. The one or more processors can perform additional operations in response to a request to reactivate the process after the process is partially deactivated, where the operations are to map compressed data elements in the second set of compacted memory segments into the second region of virtual memory via a virtual memory management module configured to cause at least the compressed data elements to be decompressed when the compressed data elements are paged in to the second region of virtual memory and map the compressed data elements in the first set of compacted memory segments into the first region of virtual memory via the virtual memory management module without decompressing the compressed data elements.

Besides what is described herein, various modifications can be made to the disclosed embodiments and implementations without departing from their scope. Therefore, the illustrations and examples herein should be construed in an illustrative, and not a restrictive sense. The scope and spirit of the various embodiments should be measured solely by reference to the claims that follow.

What is claimed is:

1. A non-transitory machine readable storage medium storing instructions which, when executed by one or more processors, cause the one or more processors to perform a method to deactivate an application executing on a device, the method comprising:
   receiving a first request to deactivate the application, wherein the application includes content stored in a memory region of system memory of the device;
   compressing the application content;
   storing the compressed application content in a freezer file;
   releasing the memory region, wherein the memory region can be used by another application; and
   partially deactivating the application by assigning a protected status to the application, wherein the protected status prevents a device function from terminating the application.

2. The non-transitory machine readable storage medium of claim 1, wherein the application remains on a list of active applications after being partially deactivated.

3. The non-transitory machine readable storage medium of claim 1, wherein a device scheduler does not schedule the application when partially deactivated.

4. The non-transitory machine readable storage medium of claim 1, wherein the compressed application content is compacted.

5. The non-transitory machine readable storage medium of claim 1, wherein the freezer file is located in a storage device.

6. The non-transitory machine readable storage medium of claim 5, wherein the storage device is selected from a group consisting of non-volatile electrically erasable semiconductor memory device and hard disk.

7. The non-transitory machine readable storage medium of claim 1, wherein the first request is in response to an indication that the application has transitioned to a state selected from the group consisting of a background state, a disabled state, and a hidden state.

8. The non-transitory machine readable storage medium of claim 1, wherein the compressed application content is mapped to virtual memory of the application.

9. The non-transitory machine readable storage medium of claim 1, further comprising:
   receiving a second request to reactivate the application;
   copying compressed contents into system memory; and
   reactivating the application as an active application that is executing on the device.

10. The non-transitory machine readable storage medium of claim 9, wherein the second request is in response to an indication that the application has transitioned to a foreground state from a state selected from the group consisting of a background state, a disabled state, and a hidden state.

11. The non-transitory machine readable storage medium of claim 1, wherein the device function is selected from the group consisting of a low memory handler, a memory usage status function, and a memory management function.

12. A method to deactivate an application executing on a device, the method comprising:
   receiving a first request to deactivate the application, wherein the application includes content stored in a memory region of system memory of the device;
   compressing the application content;
   storing the compressed application content in a freezer file;
   releasing the memory region, wherein the memory region can be used by another application; and
   partially deactivating the application by assigning a protected status to the application, wherein the protected status prevents a device function from terminating the application.

13. The method of claim 12, wherein the application remains on a list of active applications after being partially deactivated.

14. The method of claim 12, wherein a device scheduler does not schedule the application when partially deactivated.

15. The method of claim 12, wherein the compressed application content is compacted.

16. The method of claim 12, wherein the freezer file is located in a storage device.

17. The method of claim 16, wherein the storage device is selected from a group consisting of non-volatile electrically erasable semiconductor memory device and hard disk.

18. The method of claim 12, wherein the first request is in response to an indication that the application has transitioned to a state selected from the group consisting of a background state, a disabled state, and a hidden state.

19. The method of claim 12, wherein the compressed application content is mapped to virtual memory of the application.

20. The method of claim 12, further comprising:
   receiving a second request to reactivate the application;
   copying compressed contents into system memory; and
   reactivating the application as an active application that is executing on the device.

21. The method of claim 20, wherein the second request is in response to an indication that the application has transitioned to a foreground state from a state selected from the group consisting of a background state, a disabled state, and a hidden state.

22. The method of claim 12, wherein the device function is selected from the group consisting of a low memory handler, a memory usage status function, and a memory management function.

* * * * *